Sept. 13, 1932.  J. W. GORDON  1,876,914
TUBE CUTTING AND FLARING DEVICE
Filed Dec. 2, 1929  2 Sheets-Sheet 1
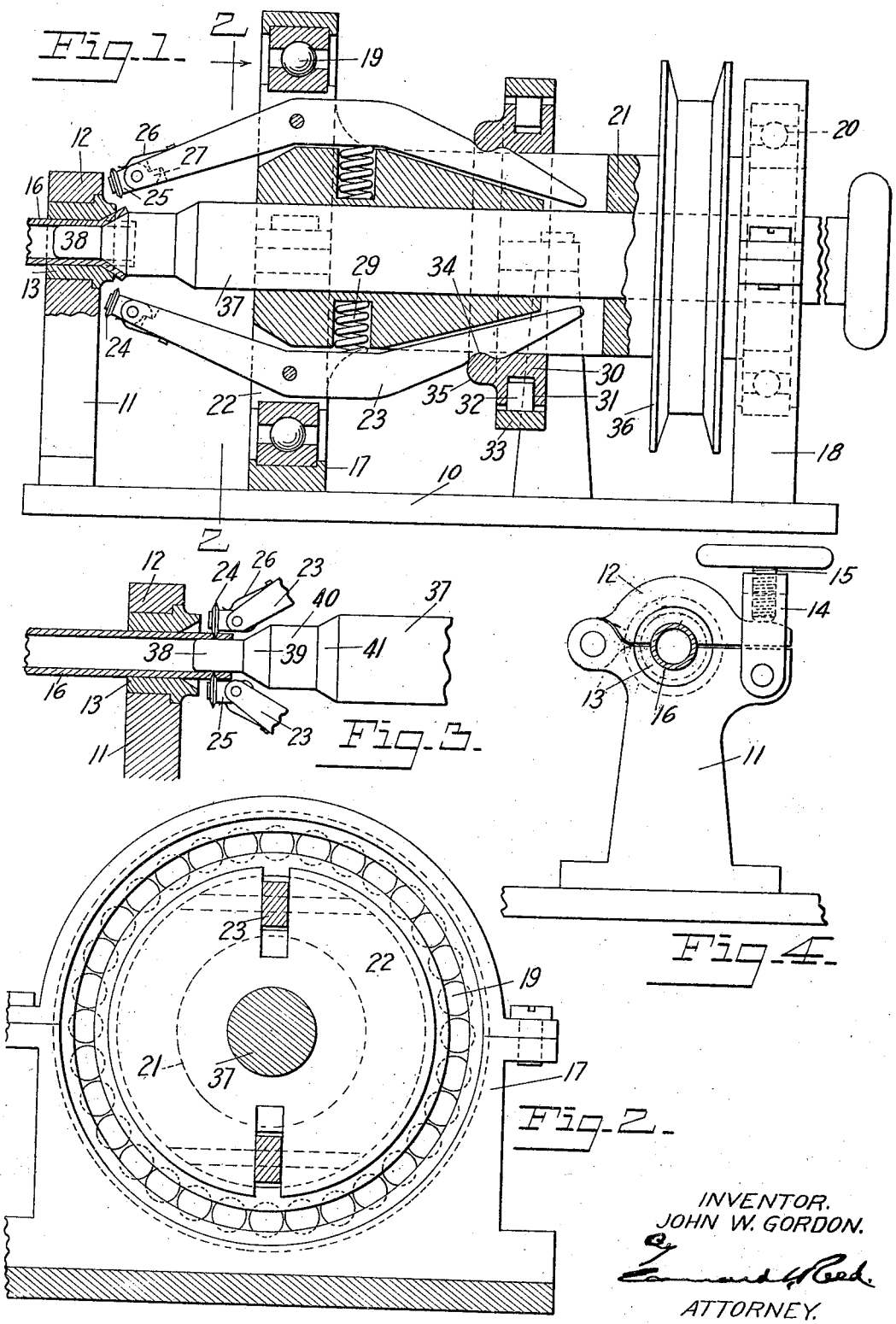
INVENTOR.
JOHN W. GORDON.
ATTORNEY.

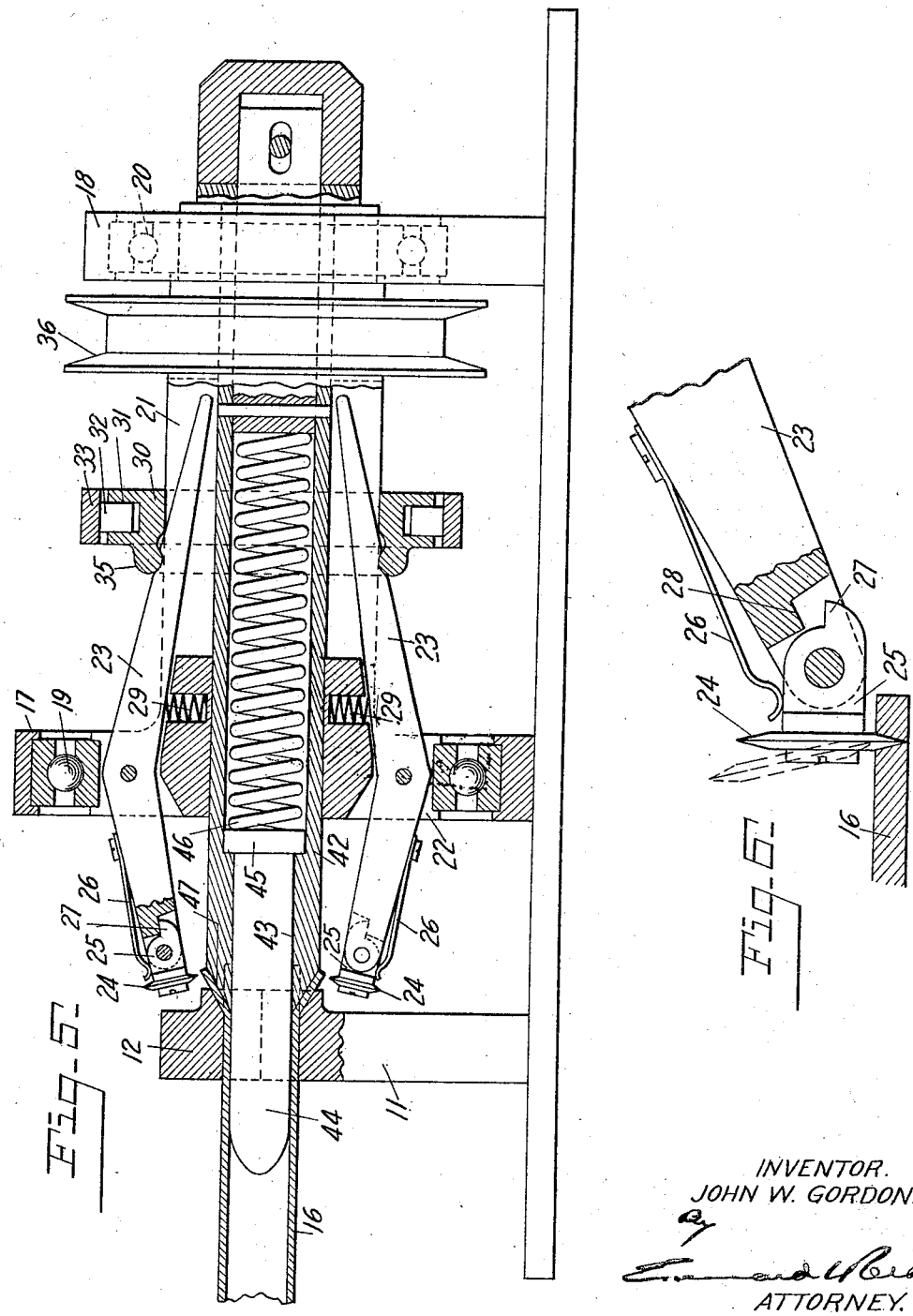

Patented Sept. 13, 1932

1,876,914

UNITED STATES PATENT OFFICE

JOHN W. GORDON, OF DAYTON, OHIO, ASSIGNOR TO THE GORDON-DUNNAM MANUFACTURING COMPANY, OF DAYTON, OHIO, A CORPORATION OF OHIO

TUBE CUTTING AND FLARING DEVICE

Application filed December 2, 1929. Serial No. 410,955.

This invention relates to tube cutters, and is designed more particularly for use with tubes of relatively soft material, such as copper. Ordinary tube cutters have a tendency to crush or destroy such a tube and one object of the present invention is to provide means for so supporting the tube during the cutting operation that it will not be distorted.

A further object of the invention is to provide such a device with means for flaring the ends of the tube after it has been cut.

The tubes are usually held in a clamp during the cutting and flaring operations, and with relatively large thin tubes the clamping pressure which is necessary to hold the tube against movement while it is being flared will sometimes crush or distort the tube and it is a further object of the invention to provide a device having means for supporting the tube during the cutting operation and for supporting the same within the clamp during the flaring operation.

A further object of the invention is to provide in connection with such a supporting device a cutting mechanism of such a character that the blades will engage the tube with a light uniform pressure.

Other objects of the invention will appear as the apparatus is described in detail.

In the accompanying drawings Fig. 1 is a side elevation, partly in section, of a tube-cutting mechanism embodying my invention; Fig. 2 is a transverse section taken on the line 2—2 of Fig. 1; Fig. 3 is a detail sectional view showing the positions of the parts during the cutting operation; Fig. 4 is an elevation of the tube clamp; Fig. 5 is a longitudinal sectional view, partly in elevation, of a modified form of the invention, and Fig. 6 is a detail view of one of the cutters and its supporting arm.

In these drawings I have illustrated certain embodiments of my invention, but it will be understood that these particular embodiments have been chosen for the purposes of illustration only and that the mechanism may take various forms without departing from the spirit of the invention.

In that form shown in Figs. 1 to 4 the mechanism comprises a base 10 having near one end thereof a tube-holding device which is preferably in the form of a clamp and which, as here shown, comprises a standard 11 extending upwardly from the base 10 and having hinged to its upper end a clamping member 12. The upper edge of the standard and the clamping member are provided with opposed recesses to receive the tube which is to be held, and in the present instance these parts are provided with bushings 13 which may be changed to accommodate the clamp to tubes of different diameters. A yoke 14 is pivotally mounted on the standard and carries a screw 15 to engage the clamping member and press the same firmly in contact with the tube, the tube being shown at 16.

Mounted on the base are two standards 17 and 18 spaced one from the other and from the tube-holding device. These standards are provided with bearings 19 and 20 which, in the present instance, are in the form of antifriction bearings. Rotatably mounted in these bearings is a blade-supporting structure or spindle 21, the forward end of which is provided with an enlargement or flange 22 which is mounted in the bearing 19 and is slotted to receive blade supporting arms 23 which are pivotally mounted between their ends on the flanged portion of the spindle. The arms 23 extend forwardly to a point near the tube holder and have mounted thereon suitable blades 24, which are here shown as rotary disks. To permit these blades to adjust themselves as they engage the tube and to cut in a plane at substantially right angles to the tube I have provided each arm 23 at its forward end with a pivoted portion 25 on which the blade is rotatably mounted and which is acted upon by a spring 26 which tends to move it into alinement with the main portion of the arm, this movement being limited by a lug 27 on the portion 25 which engages a shoulder 28 on the main portion of the arm.

The arms may be actuated in any suitable manner to move the blades into and out of operative engagement with the tube, but in order that the blades may engage the tube with a light uniform pressure I prefer that the arms shall be spring-actuated and, in the present construction, springs 29 are mounted in sockets in the spindle, on the rear side of the flange 22, and act on the inner edges of the arms to move the latter about their axes. A suitable retracting device is provided to move the arms against the action of the springs and withdraw the blades from the tube. In the particular construction here shown the arms converge rearwardly and a collar 30 is slidably mounted on the spindle 21 to engage the inclined edges of the arms and force the same inwardly against the springs thus retracting the blades. The collar may be actuated in various ways, manually or otherwise but, in the present instance, it is provided with a circumferential groove 31 into which extends studs 32 carried by a shifting yoke 33 of the usual type. The arms and the retracting device have cooperating parts to retain the arms in their retracted positions during the intervals between cutting operations and, as here shown, each arm has in its outer edge a recess to provide a shoulder 34 and the collar has forwardly extending projections 35 to engage the shoulders. The spring pressure on the arms will hold the shoulders firmly in contact with the projections and thus prevent the rearward movement of the retracting device or collar until positive pressure is applied thereto by the shifting yoke. The spindle may be rotated either manually or by power, and it is here shown as provided with a belt pulley 36 by means of which it may be driven.

The rotatable structure or spindle 21 is provided with an axial bore in which is slidably mounted a mandrel 37 which extends beyond the spindle and has at its forward end a cylindrical portion 38 adapted to fit within the end of the tube which is to be cut and to extend beyond the line on which the cut is to be made, and which thus serves to support the tube during the cutting operation and to prevent the same from being crushed or otherwise distorted by the action of the cutters. After the tube has been cut the end thereof is usually flared to provide means for applying a coupling thereto, and in order that the mandrel may also be used for this purpose it is provided at the rear end of the portion 38 thereof with a tapered portion 39 which may be caused to engage and enter the tube and thus flare the end thereof. The forward movement may be imparted to the mandrel in any suitable manner, as by tapping the rear end thereof, beyond the standard 18, with a hammer. The mechanism may be adapted to tubes of different sizes by providing interchangeable mandrels, but a single mandrel may be adapted for use with tubes of two or more sizes, and the mandrel shown in Figs. 1 and 3 has in the rear of the tapered portion 39 a second cylindrical portion 40 adapted to enter a tube of larger diameter and support the same during the cutting operation, and in the rear of this cylindrical portion 40 is a second tapered portion 41 for flaring the larger tube.

In the operation of the device the tube is first clamped in place, the mandrel inserted in the end thereof, the cutting mechanism set in operation and the retracting device moved rearwardly to release the blade carrying arms and permit the blades to be moved into contact with the tube. The spindle is rotated at a relatively high speed so that the cut is quickly completed even though the blades engage the tube with a relatively light pressure. Ordinarily a section of the tube remains on the mandrel after the cut has been completed, and before the flaring operation can be effected the mandrel must be withdrawn and this ring removed. The mandrel is then again inserted in the tube and the tapered portion forced into the tube to flare the same. The whole operation can be very quickly and easily accomplished and the tube will be cut with a clean uniform cut and will not be distorted from its true cylindrical shape.

Tubes of small diameter will usually be held in the clamp during the flaring operation without the use of pressure sufficient to distort the same; but with larger tubes it frequently happens that the pressure necessary to hold the tube during the flaring operation will crush or otherwise slightly distort the same, and when such a tube is to be cut I prefer to provide means for supporting the tube within the clamp during the flaring operation. This may be accomplished in various ways and in Fig. 5 of the drawings I have shown a mandrel of such a character that it can be used both for supporting a tube during the cutting operation and for supporting the tube upon the mandrel during the flaring operation. The cutting mechanism shown in Fig. 5 is the same as that above described and the mandrel is mounted in the same manner but in this instance the mandrel comprises two relatively movable parts. A body portion 42 is slidably mounted in the spindle 21 and is provided at its forward end with a guideway 43 in which is slidably mounted a portion 44 adapted to enter the tube. The body portion of the mandrel in the rear of the guideway is hollow and of a diameter somewhat greater than the diameter of the guideway 43 and the part 44 of the mandrel has an enlarged head 45 to engage the shoulder at the forward end of this hollow portion of the mandrel. A spring 46 acts on the head to yieldably hold the part 44 in its foremost position with relation to the body portion. The forward end of the body portion 42 is tapered, as shown at 47, to provide a flaring surface. With this form of mandrel the cutting operation is the same as with the mandrel in Figs. 1 and 3, that is, the part 44 of the mandrel is inserted in the tube and serves to support the same against distortion by the action of the blades. After the cutting operation has been completed the mandrel is withdrawn, the severed section of the tube removed therefrom and the part 44 is then again inserted in the tube and extended through the clamp. The clamp is then tightened down to firmly secure the tube in place, the mandrel preventing the crushing of the tube by the clamp. The body portion 42 of the mandrel is then moved forwardly with relation to the part 44 thereof, as by tapping the rear end thereof with a hammer, thus causing the flaring surface 47 to engage the tube and flare the same.

While I have shown and described certain embodiments of my invention, I wish it to be understood that I do not desire to be limited to the details thereof as various modifications may occur to a person skilled in the art.

Having now fully described my invention, what I claim as new and desire to secure by Letters Patent, is:

1. In a tube cutter, a tube-holding device, a rotatable blade-supporting device, blades carried by said blade-supporting device and movable into positions to engage a tube in said tube-holding device, and a mandrel mounted for longitudinal movement and having a part adapted to enter the tube and to support the same during the cutting operation.

2. In a tube cutter, a tube-holding device, a rotatable blade-supporting device, blades carried by said blade-supporting device and movable into positions to engage a tube in said tube-holding device, and a mandrel mounted for longitudinal movement and having a part adapted to enter the tube and to support the same during the cutting operation, said mandrel also having a tapered portion to engage the end of said tube and flare the same.

3. In a tube cutter, a tube-holding device, a rotatable structure having an axial bore, blade-supporting members movably mounted on said structure, blades carried by said members, means for actuating said members to move said blades into operative engagement with a tube in said tube-holding device, and a mandrel slidably mounted in said rotatable structure and having a portion adapted to enter said tube and support the same during the cutting operation.

4. In a tube cutter, a tube-holding device, a rotatable structure having an axial bore, blade-supporting members movably mounted on said structure, blades carried by said members, means for actuating said members to move said blades into operative engagement with a tube in said tube-holding device, and a mandrel slidably mounted in said rotatable structure and having a portion adapted to enter said tube and support the same during the cutting operation, and having at the rear end of said supporting portion a tapered portion to engage the end of said tube and flare the same.

5. In a tube cutter, a tube-holding device, a rotatable blade-supporting device, blades carried by said blade-supporting device and movable into positions to engage a tube in said tube-holding device, and a mandrel mounted for longitudinal movement and having a part adapted to enter the tube and to support the same during the cutting operation, said mandrel also having a part movable lengthwise of said supporting part and provided with a tapered end to engage the end of said tube and flare the same.

6. In a tube cutter, a tube-holding device, a rotatable blade-supporting device, blades carried by said blade-supporting device and movable into and out of engagement with a tube in said tube-holding device, and a mandrel mounted for longitudinal movement and comprising a portion having a longitudinal guideway and having its forward end tapered, and a portion slidably mounted in said guideway, extending beyond the forward end thereof and adapted to enter said tube.

7. In a tube cutter, a tube-supporting clamp, a rotatable structure having a longitudinal bore, blade-supporting members movably mounted on said structure, blades carried by said members, means for actuating said members to move said blades into operative engagement with a tube in said clamp, and a mandrel comprising a body portion slidably mounted in the bore of said rotatable structure, having its forward end tapered and having a longitudinal guideway, and a part slidably mounted in said guideway and extending beyond the forward end thereof and adapted to enter said tube and support the same during the cutting operation and also adapted to be clamped within said tube and held against movement while longitudinal movement is imparted to said body portion to flare the end of said tube.

8. In a tube cutter, a tube-supporting clamp, a rotatable structure having a longitudinal bore, blade-supporting members movably mounted on said structure, blades carried by said members, means for actuating said members to move said blades into operative engagement with a tube in said clamp, and a mandrel comprising a body portion slidably mounted in the bore of said rotatable structure, having its forward end tapered and having a longitudinal guideway, a part slidably mounted in said guideway and extending beyond the forward end thereof and adapted to enter said tube and support the same during the cutting operation and also adapted to be clamped within said tube and held against movement while longitudinal movement is imparted to said body portion to flare the end of said tube, and a spring arranged within said body portion and acting on the last-mentioned part to hold the latter normally in its extended position.

9. In a tube cutter, a tube-holding device, a rotatable structure having an axial bore, blade-supporting arms pivotally mounted on said structure, blades carried by said arms, means mounted on said structure for actuating said arms to move said blades into and out of operative engagement with a tube in said holding device, and a mandrel slidably mounted in the bore of said structure and having a part adapted to enter said tube and support the same during the cutting operation.

10. In a tube cutter, a tube-holding device, a rotatable structure having an axial bore, blade-supporting arms pivotally mounted on said structure, blades carried by said arms, springs acting on said arms to move said blades into operative engagement with a tube in said holding device, means for moving said arms against the action of said springs, and a mandrel slidably mounted in the bore of said structure and having a part adapted to enter said tube and support the same during the cutting operation.

11. In a tube cutter, a tube-holding device, a rotatable structure having an axial bore, blade-supporting arms pivotally mounted on said structure, blades carried by said arms, springs mounted in said structure and acting on said arms to move said blades into operative engagement with a tube in said holding device, a retracting device movably mounted on said structure to move said arms against the action of said springs, and a mandrel slidably mounted in the bore of said structure and having a part adapted to enter said tube and support the same during the cutting operation.

12. In a tube cutter, a tube-holding device, a rotatable structure having an axial bore, blade-supporting arms pivotally mounted on said structure, blades carried by said arms, springs mounted in said structure and acting on said arms to move said blades into operative engagement with a tube in said holding device, a retracting device slidably mounted on said structure to move said arms against the action of said springs, said arms and said retracting device having cooperating parts to retain said arms in their retracted positions, and a mandrel slidably mounted in the bore of said structure and having a part adapted to enter said tube and support the same during the cutting operation.

In testimony whereof, I affix my signature hereto.

JOHN W. GORDON.